United States Patent [19]

Buchner

[11] 3,860,758

[45] Jan. 14, 1975

[54] A TDM SWITCH WITH PLURAL SINGLE-CHARACTER BUFFERS ASSOCIATED WITH EACH OUTPUT LINE

[75] Inventor: Robert Bertold Buchner, Helversum, Netherlands

[73] Assignee: U.S. Philips Corporation, New York, N.Y.

[22] Filed: Sept. 28, 1973

[21] Appl. No.: 401,660

Related U.S. Application Data

[63] Continuation of Ser. No. 124,792, March 16, 1971, abandoned.

[30] Foreign Application Priority Data

Mar. 25, 1970 Netherlands ....................... 7004339

[52] U.S. Cl. ............................................ 179/15 AQ
[51] Int. Cl. ............................................ H04j 3/00
[58] Field of Search ....... 179/15 AQ, 15 AT, 18 GF

[56] References Cited

UNITED STATES PATENTS

| | | | |
|---|---|---|---|
| 3,263,030 | 7/1966 | Stiefel | 179/15 AT |
| 3,458,659 | 7/1969 | Sternung | 179/15 AQ |
| 3,639,693 | 2/1972 | Bartlett | 179/15 AT |
| 3,649,763 | 3/1972 | Thompson | 179/15 AQ |
| 3,678,205 | 7/1972 | Cohen | 179/15 AQ |

*Primary Examiner*—David L. Stewart
*Attorney, Agent, or Firm*—Frank R. Trifari; Simon L. Cohen

[57] ABSTRACT

A telecommunication system with time division multiplex in which between a second-order multiplex channel, comprising a multiple group of connection channels for the transmission of information characters, and a transmission line unit a switching unit is provided for switching the second-order multiplex channel to the transmission line unit in sub-time intervals of selected connection channels; in which in order to increase the accessibility of the outgoing main time interval channels of the outgoing transmission line, the transmission line unit comprises more than two single character buffers over which the information characters are distributed in dependence upon variable control information, the single character buffers being connected to the transmission line in a cyclic sequence.

2 Claims, 6 Drawing Figures

INVENTOR.

ROBERT BERTOLD BUCHNER

BY

AGENT

INVENTOR.

ROBERT BERTOLD BUCHNER

BY

AGENT

INVENTOR.

BY ROBERT BERTOLD BUCHNER

AGENT

INVENTOR.

ROBERT BERTOLD BUCHNER

BY

AGENT

INVENTOR.
BY ROBERT BERTOLD BUCHNER
AGENT

A TDM SWITCH WITH PLURAL SINGLE-CHARACTER BUFFERS ASSOCIATED WITH EACH OUTPUT LINE

This is a continuation, of application Ser. No. 124,792, filed Mar. 16, 1971, now abandoned.

The invention relates to a telecommunication system with time division multiplex, comprising a source of multiplex telecommunication signals, which comprises a multiple group of single connection channels for the transmission of information characters, a transmission line unit and connected thereto a transmission line which comprises a group of single transmission channels for the transmission of information characters, a clock for generating a time scale which is divided into mutually equal frame time intervals, each of which is divided into mutually equal main time intervals, each of which is divided into mutually equal sub-time intervals, a subtime interval having the same relative position in each frame time interval being associated with each connection channel in each frame time interval, a main time interval having the same relative position in each frame time interval being associated with each transmission channel, a switching unit having connected thereto a control unit containing variable control information for switching the source to the transmission line unit in the sub-time intervals of selected connection channels, the transmission line unit being provided with at least two single character buffers for the reception of information characters in sub-time intervals, and for the transmission of the received information characters to the transmission line in main time intervals.

A telecommunication exchange in which between an output of the switching network, this output being indicated above as the source of multiplex telecommunication signals, and the transmission line unit of a transmission line a switching unit is provided for switching the output of the switching network to the transmission line unit in the sub-time intervals of selected connection channels, is known from the published Netherlands Pat. Application No. 6,706,929. In this Application, the transmission line unit is indicated as a parallel-series converter, whilst it appears from the description that this parallel-series converter can receive an information character in parallel form in one sub-time interval of each main time interval and can transmit each received information character in the next main time interval. This parallel-series converter comprises at least two single parallel-series converters, which are indicated above as character buffers.

In the said known telecommunication exchange each transmission channel of an outgoing transmission line is accessible for $p$ connection channels if $p$ is the number of sub-time intervals of one main time interval and, conversely, each connection channel has access to not more than one outgoing transmission channel.

The invention has for its object to provide a novel concept of the above-mentioned telecommunication system in order to achieve in a simple manner an increased accessibility of the outgoing transmission channels, and to reduce the internal blocking probability, i.e. the conditional probability that at a calling instant an incoming channel cannot be connected to an outgoing channel if the outgoing channel is free.

SUMMARY OF THE INVENTION

The telecommunication system according to the invention is characterized in that the transmission line unit comprises more than two single character buffers, a control unit containing variable control information for the supply of control information to the transmission line unit in the sub-time intervals of said selected connection channels being associated with the source, the transmission line unit being provided with a distribution unit for distributing the information characters over the single character buffers in dependence upon the control information, the transmission line unit being provided with a combination unit for connecting the single character buffers in a cyclic sequence to the transmission line in main time intervals of the clock.

The invention offers the advantage that an increased accessibility and a reduced internal blocking probability can be achieved by using a device which is used for other purposes, i.e. matching of different clock-speeds and series-parallel conversion, at the input of the telecommunication exchange where transmission lines enter from other exchanges. In this latter application the characters are distributed cyclically among the character buffers under the control of the clock of the incoming transmission line and are read out cyclically under the control of the clock of the exchange, while conversion from the series form into the parallel form can take place at the same time.

In order that the invention may be readily carried into effect, one embodiment thereof will now be described in detail, by way of example, with reference to the accompanying diagrammatic drawings, in which:

FIGS. 1*a* and 1*b* are a block-schematic diagram of a telecommunication exchange with time division multiplex, while using a telecommunication system according to the invention;

Figure 1A:
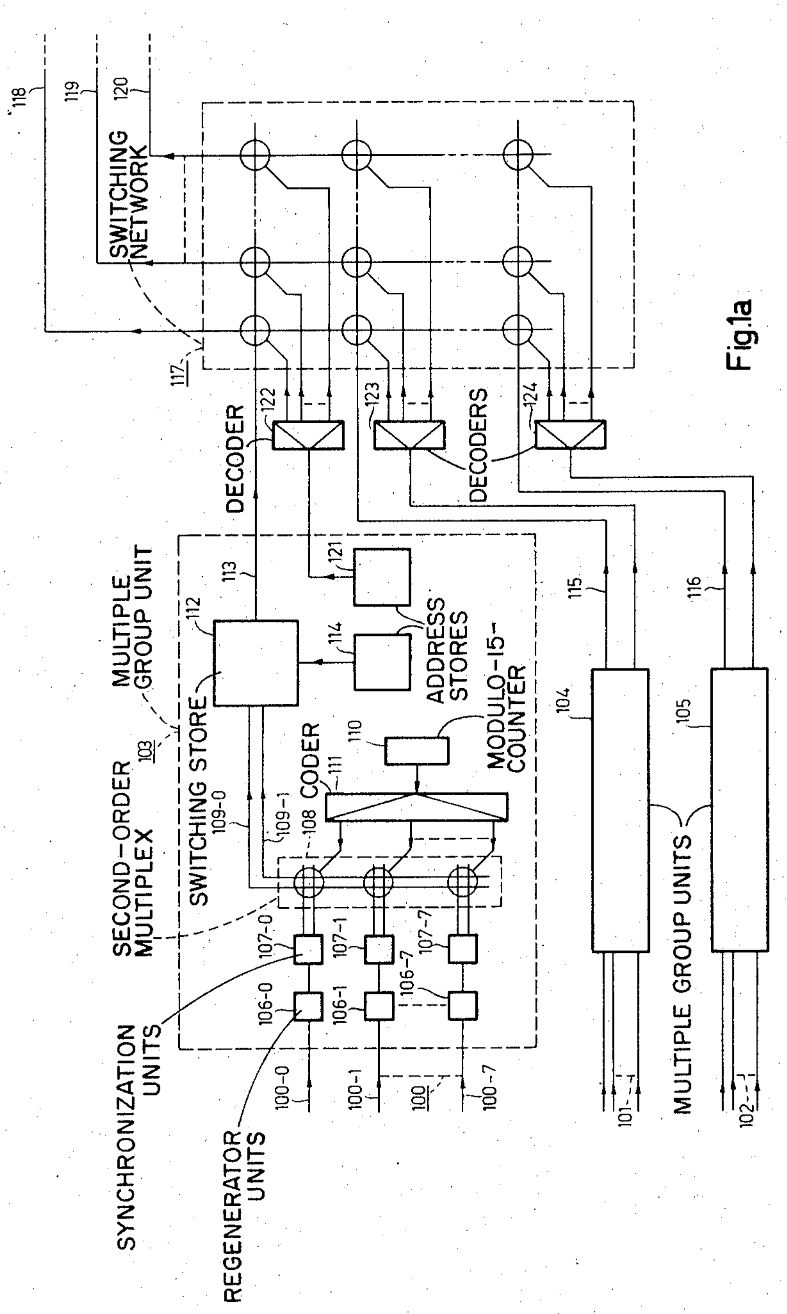
Figure 1B:
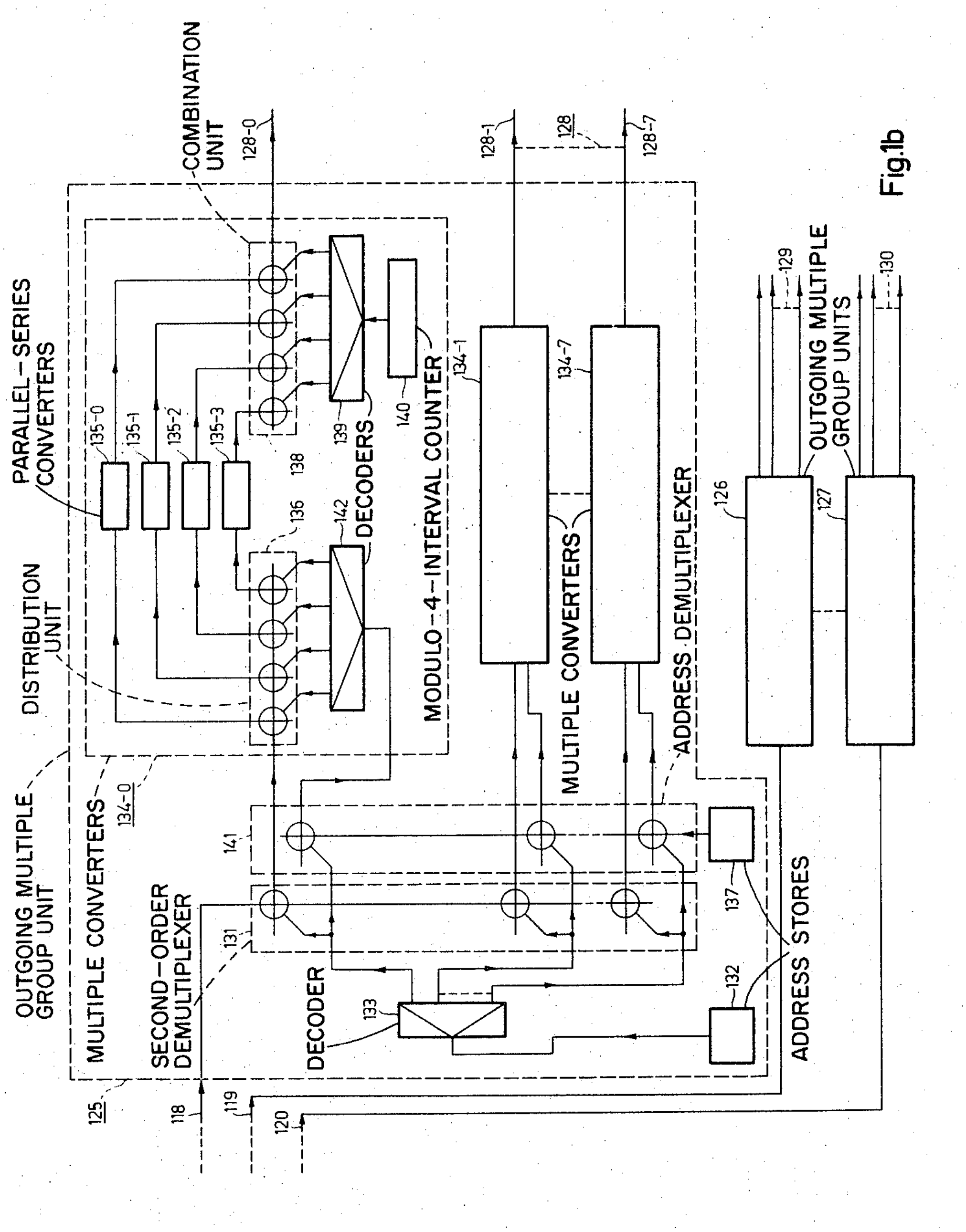

The references 100-0, 100-1 and 100-7 in FIG. 1 denote transmission lines, each of which serves for 32 incoming single transmission channels which are combined by time division multiplexing. A sequence of pulse code groups representing characters of 8 bits may be transmitted through each single transmission channel. These characters represent in a binary code the amplitude values of samples of analog signals, for example, of speech signals, but may alternatively fully or partly represent other data.

The multiplex signal of an incoming transmission line, and also that of an outgoing transmission line, is composed of signal frames, the frame repetition frequency of which is the same throughout the entire system under consideration. A signal frame of a received or transmitted multiplex signal consists of 32 characters, i.e. one character of every single transmission channel. The bits of every character occupy successive bit positions in the signal frame. Owing to this mode of transmission the received and transmitted multiplex signals are in fact bit sequences. A single transmission channel uses in every frame time interval one channel interval which has the same relative position or number in every frame time interval. This number is at the same time the number of the channel.

The frame repetition frequency is at the same time the character repetition frequency of a single transmission channel. This character repetition frequency remains unchanged when an incoming channel is switched through to an outgoing channel via one or more switching stages, whether or not use is made of higher order time multiplexing. In systems having pulse coding (PCM), in which each character represents the amplitude value of a signal sample in a binary code, the frame repetition frequency is indicated as the sample frequency and a frame time interval is indicated as a sample period.

The time scale of the transmitted multiplex signals is determined by the clock of the exchange under consideration. The time scales of the received multiplex signals are determined by the clocks of the exchanges or concentrators transmitting these signals. The clock of the exchange under consideration is indicated as the local clock. The clocks of the exchanges transmitting multiplex signals to the exchange under consideration are indicated as remote clocks.

The local clock divides the time axis into mutually equal local frame time intervals. Each local frame time interval is divided into 32 mutually equal local main time intervals $t_0$, $t_1$ - - - , $t_{n-1}$. Each main time interval is divided into eight mutually equal local bit intervals $b_0$, $b_1$, - - - , $b_7$, and 15 mutually equal sub-time intervals $s_0$, $s_1$, - - - , $s_{14}$. The latter are used only in the exchange.

The channel intervals of the outgoing transmission lines are formed by the main time intervals of the local clock.

A group of 32 single transmission channels using a common transmission line forms a first order multiplex channel. The common transmission line is indicated as a 32-channel transmission line. In the exchange use is made of second-order multiplex channels comprising 15 (32) = 480 single channels. The channel intervals of the latter channels are formed by the sub-time intervals of the local clock, 480 of which are present in each frame time interval. A transmission line which is used by a second-order multiplex channel is indicated as a 480-channel transmission line. A character is transmitted in parallel form in a sub-time interval through a multiplex line.

The time scale of the multiplex signal is regenerated at the receiver end. For the purpose of distinction the time interval indications of a regenerated time scale are provided with an index. The regenerated time scale consists of frame time intervals which are divided into the main time intervals $t'_0$, $t'_1$, - - - , $t'_{31}$, eac of which is divided into the bit intervals $b'_0$, $b'_1$, - - - ,$b'_7$.

The transmission lines 100-0, 100-1 and 100-7 form the first, the second and the eighth transmission line of a group of eight transmission lines 100. This group of transmission lines is indicated as an incoming multiple group. Further multiple groups are indicated in FIG. 1 by 101 and 102. Thus, a multiple group of connection channels is a group of conductors, each carrying a separate time division multiplex signal consisting of a sequentially occuring series of time intervals (channels). During each of the periodically occuring time intervals or channels a character may be transmitted.

The group of transmission lines 100 is connected to the incoming multiple group unit 103. The multiple groups 101 and 102 are connected to the multiple group units 104 and 105. The latter are constructed in the same manner as the multiple group unit 103 and are represented in FIG. 1 by blocks.

The transmission lines 100-0, 100-1 and 100-7 are connected in the multiple group unit 103 to the regenerator units 106-0, 106-1 and 106-7. A clock regenerator unit which is present in each regenerator unit regenerates the time scale of the received multiplex signal. The frame synchronization between the regenerated time scale and the actual time scale of the received multiplex signal is effected by a frame synchronization unit which uses for this purpose, for example, the frame synchronization information present in one of the channels. The received bits are regenerated with the aid of a regenerated clock signal having the bit frequency. The regenerator units 106-0, 106-1 and 106-7 are connected to the synchronization units 107-0, 107-1 and 107-7.

Due to differences in speed between the remote clock and the local clock and/or due to delay time variations on the transmission path, a shift varying with time occurs between the regenerated time scale and the local time scale.

The shift of the regenerated multiplex signal with respect to the local time scale is rounded off in the synchronization unit to an integral number of local main time intervals by a variable time delay connected in the signal path of the regenerated multiplex signal. The synchronization unit provides a conversion of the characters from the series form to the parallel form and supplies for each character the associated channel number and line number. The latter number is permanently stored in a register of the synchronization unit.

A second-order multiplex 108 converts the 8(32) = 256 incoming signals of multiple group 100 into a corresponding number of channels of the 480-channel connection line 109-0. Multiplexer 108 is controlled by the combination of a modulo-15- sub-time interval counter 110 and a coder 111 which determines the cycle of multiplexer 108 on a local main time interval. In each main-time interval each synchronization unit is connected in an individually associated sub-time interval to line 109-0 in order to supply a character thereto. At the same time a connection is established with line 109-1 in order to supply the channel number and the line number of the character thereto. The 480 − 256 = 224 channels remaining on line 109-0 and line 109-1 can be used in groups of 32 for further incoming transmission lines or other sources of multiplex signals.

The twin line 109 forms the input of a switching store 112. This store has such a storage capacity that one signal frame of each multiplex signal of the multiple group can be stored therein. The switching store comprises eight sectors and each sector comprises 32 channel registers, in each one of which one character can be stored. The 256 channels of line 109-0, corresponding to the 256 channels of the incoming multiple group 100, are spatially distributed in switching store 112 by storing each character in the channel register identified by the line number and the channel number.

The output of the switching store is formed by the 480-channel primary intermediate line 113. Each incoming channel of the multiple group 100 can be connected via the corresponding channel register of switching store 112 to each channel of the primary intermediate line 113 under the control of a cyclic address store 114. For further reference a channel of a primary intermediate line is indicated as a primary intermediate channel. The address store 114 comprises 480 store positions, which are associated one-to-one with the primary intermediate channels of intermediate line 113. The address of a store position is the same as the number of the primary intermediate channel with which the store position is associated and vice versa. In each store position the address (line number + channel number) of an incoming channel can be stored. The cycle of the address store is equal to one frame time interval. The contents of each store position is presented to the output of the address store in each frame time interval in the sub-time interval of the primary intermediate channel and is supplied to the switching store 112. The address of an incoming channel identifies the channel register of the incoming channel and ensures, when supplied to the switching store, the transmission of the character stored in the channel register to intermediate line 113. The storage of the address of an incoming channel in a store position of address store 114 therefore provides a connection between the incoming channel and the primary intermediate channel with which the store position is associated.

The primary intermediate line 113, coming from multiple group unit 103, and the corresponding primary intermediate lines 115 and 116, coming from the multiple group units 104 and 105, form the inputs of a single-stage switching network with space division 117. The outputs of the switching network are formed by the 480-channel secondary intermediate lines 118, 119 and 120. The switching network comprises controllable cross-point members for connecting every input to every output. These controllable crosspoint members are indicated as crosspoints.

The crosspoints of the primary intermediate line 113 are controlled by a cyclic address store 121 in multiple group unit 103 via the decoder 122. Under the control of this store each primary intermediate channel of intermediate line 113 can be connected to a secondary intermediate channel coinciding in time therewith, i.e. a secondary intermediate channel having the same number as the primary intermediate channel, of each secondary intermediate line 118, 119 and 120.

The address store 121 comprises 480 store positions which are associated one-to-one with the primary intermediate channels of intermediate line 113. The operation of all address stores is in principle the same as the operation of the address store 114 and it will therefore not be described again for each address store.

In each store position of the address store 121 the address of a secondary intermediate line can be stored. This address identifies the crosspoint of the secondary intermediate line with the primary intermediate line 113 and ensures, when supplied to decoder 122, that the crosspoint is closed. The storage of the address of a secondary intermediate line in a store position of address store 121 therefore provides a connection between the primary intermediate channel with which the store position is associated and the secondary intermediate channel, having the same number as the primary intermediate channel, of the secondary intermediate line.

The crosspoints of the intermediate lines 115 and 116 are controlled in a corresponding manner from the multiple group units 104 and 105 via the decoders 123 and 124.

The secondary intermediate lines 118, 119 and 120 form the inputs of the outgoing multiple group units 125, 126 and 127. The multiple group units 126 and 127 are constructed in the same manner as the multiple group unit 125 and are represented by blocks. The outgoing 32-channel transmission lines 128-0, 128-1 and 128-7 are connected to multiple group unit 125. These transmission lines form the first, the second, and the eighth transmission line of a group of eight transmission lines 128. This group is indicated as an outgoing multiple group. The outgoing multiple groups 129 and 130 are connected to the multiple group units 126 and 127.

In multiple group unit 125 the secondary intermediate line 118 is connected to the input of a second-order demultiplexer 131. The latter distributes the channels of the secondary intermediate line 118 among the outgoing transmission lines. The demultiplexer 131 comprises a crosspoint between the secondary intermediate line 118 and each of the transmission lines of multiple group 128. The demultiplexer is controlled by a cyclic address store 132 via the decoder 133. The cyclic address store 132 comprises 480 store positions which are asociated one-to-one with the secondary intermediate channels of intermediate line 118. In each store position, the address, i.e. the number, of an outgoing transmission line can be stored. This address identifies the crosspoint between the outgoing transmission line and the secondary intermediate line 118 and ensures, when supplied to decoder 133, that the crosspoint is closed. The storage of the address of an outgoing multiplex line in a store position of the address store 132 therefore provides a connection between the secondary intermediate channel with which the store position is associated and the outgoing multiplex line.

Multiple parallel-series converters 134-0, 134-1 and 134-7 are connected between demultiplexer 131 and the transmission lines 128-0, 128-1 and 128-7.

The multiple parallel-series converters 134-1 and 134-7 are constructed in the same manner as the multiple parallel-series converter 134-0 and are represented by blocks.

The multiple parallel-series converter 134-0 comprises the four single parallel-series converters 135-0, 135-1, 135-2 and 135-3. The output of demultiplexer 131, which output is associated with the transmission line 128-0, forms the input of a distribution unit 136. This distribution unit distributes the characters received among the single parallel-series converters in accordance with addresses which are received from a cyclic address store 137. The multiple parallel-series converter 134-0 furthermore comprises a combination unit 138. The inputs of this combination unit are formed by thee outputs of the single parallel-series converters 135-0, 135-1, 135-2 and 135-3. The output is formed by transmission line 128-0. The combination unit 138 comprises a crosspoint between each input and the output. These crosspoints are controlled from the outputs of a decoder 139 which is connected to a modulo-four-maintime interval counter 140. This counter supplies the addresses of the single parallel-series converters 135-0, 135-1, 135-2 and 135-3 in a cyclic sequence. When an address is supplied to decoder 139 the relevant cross-point is closed in the combination unit 138. In this manner the single parallel-series converters are connected in a cyclic sequence and upon every indication for the duration of one main-time interval to the outgoing transmission line 128-0.

The cyclic address store 137 has 480 store positions which are associated one-to-one with the secondary intermediate channels of intermediate line 118, in each one of which the address of a single parallel-series converter can be stored. The output of the address store 137 is connected to the input of the address demultiplexer 141. The latter has one output for each outgoing transmission line 128-0, 128-1 and 128-7, and has a crosspoint between the input and each output. These crosspoints are controlled in parallel-connection with the crosspoints of demultiplexer 131 from the outputs of the decoder 133. When a crosspoint is closed in demultiplexer 131 in order to supply a character to a multiple parallel-series converter, a cross-point is closed at the same time in the address demultiplexer 141 in order to supply an address to the same multiple parallel-series converter.

The distribution unit 136 has an output for each single parallel-series converter, which output is connected to the information input of the relevant single parallel-series converter, and has a crosspoint between the input and each output. The output of the address demultiplexer 141, associated with transmission line 128-0, is connected to the decoder 142. The crosspoints of the distribution unit 136 are controlled from the outputs of decoder 142. When an address of a single parellel-series converter is supplied to decoder 142, the relevant crosspoint in the distribution unit 136 is closed. In this manner each character supplied to distribution unit 136 is stored in the single parallel-series converter, which is identified by the address supplied in the same subtime interval by the address demultiplexer 141.

The address store 137 has 480 store positions which are associated in the same way as for the address store 132 one-to-one with the secondary intermediate channels of intermediate line 118. For each secondary intermediate channel in use the address store 137 supplies the address of a single parallel-series converter in the sub-time intervals of this channel. This address is supplied by address demultiplexer 141 to the multiple parallel-series converter of the transmission line, the address of which is given by the address store 132. Each parallel-series converter stores the character supplied thereto and transmits the character in series form in the maintime interval in which the output is connected to transmission line 128-0.

For a further explanation of the operation of the multiple parallel-series converter 134-0, the following assumptions are made. It is assumed that the single parallel-series converters are connected to the transmission line 128-0 in the sequence 135-0, 135-1, 135-2, 135-3 under the control of the main time interval counter 140. It is furthermore assumed that the main time interval counter 140 is synchronized with the local clock so that in the main time interval to the single parallel-series converter 135-0 is connected to transmission line 128-0. The single parallel-series converter 135-0 is then associated with the outgoing channel number 0. Characters which are to be transmitted via this channel will pass the single parallel-series converter 135-0. In this respect the parallel-series converter 135-0 is the transmission register of the outgoing channel number 0. As parallel-series converter 135-0 is also connected in the main time intervals $t_4$, $t_8$, - - - - $t_{28}$ to transmission line 128-0, it is also the transmission register for the outgoing channels numbers 4, 8, - - -, 28. The following table gives the relation with the outgoing channels for each of the single parallel series converters.

TABLE 1

| single parallel-series converter | channel number | |
|---|---|---|
| 135-0, address $AD_0$, | 0 | 4, 8, 12, 16, 20, 24, 28 |
| 135-1, address $AD_1$, | 1 | 5, 9, 13, 17, 21, 25, 29 |
| 135-2, address $AD_2$, | 2 | 6, 10, 14, 18, 22, 26, 30 |
| 135-3, address $AD_3$, | 3 | 7, 11, 15, 19, 23, 27, 31 |

Figure 2:
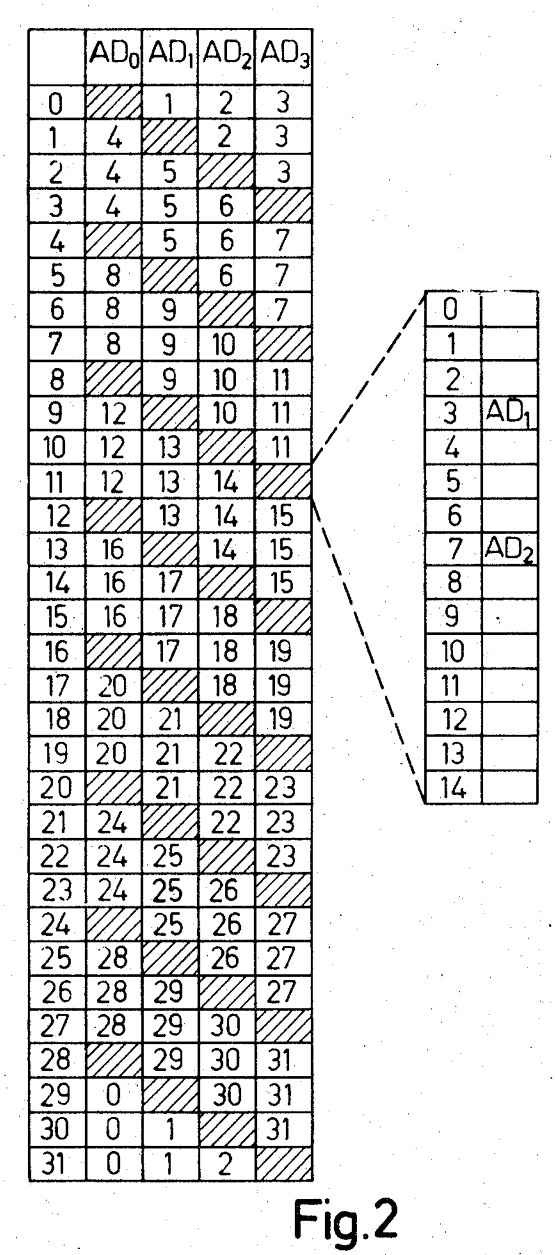
FIG. 2 is a table of connection possibilities.

FIG. 2 contains a table giving a survey of the connection possibilities between the secondary intermediate channels of a secondary intermediate line and the channels of the relevant outgoing multiple group. The table consists of 32 lines and five columns. Each line corresponds to a group of 15 store positions of the cyclic address store 137, which are associated one-to-one with the secondary intermediate channels of intermediate line 118. In the left-hand column, the numbers of the local main time intervals are given in which the contents of the relevant group of store positions appear on the output of the cyclic address store. The division of each line into 15 store positions is given in a subtable for line 11. This sub-table consists of 15 lines and two columns. Each line corresponds to a store position. The left-hand column gives the numbers of the subtime intervals of maintime interval $t_{11}$ in which the contents of the relevant store positions appear on the output of the cyclic address store. The address $AD_1$ is stored in store position 3 of line 11 and the address $AD_2$ is stored in store position 7 of line 11. The characters of the secondary intermediate channel with the subtime intervals $s_3$ of the main time intervals $t_{11}$, further indicated as the sub-time intervals $s_3 \cdot t_{11}$, will then be supplied to the single parallel-series converter 135-1, and the characters of the secondary intermediate channel with the sub-time intervals $s_7 \cdot t_{11}$ will be supplied to the single parallel-series converter 135-2.

The lines in which the address given above the column must not be stored are indicated by a shading in each column to the right of the left-hand column of the main table. The lines subject to a storage band correspond to the maintime intervals in which the parallel-series converter whose address is indicated above the column, transmits characters. For the single parallel-series converter 135-0, for example, these are the main time intervals 0, 4, - - - , 28, as may be deduced from table 1.

In each column to the right of the left-hand column of the main table, each line not subject to a storage band indicates the number of the outgoing channel which is accessible to each of the group of 15 secondary intermediate channels corresponding to the line when the address given above the column is stored in the store position of the secondary intermediate channel. For example, for the secondary intermediate channels corresponding to line 11, the outgoing channel 12 is accessible with address $AD_0$, the outgoing channel number 13 with address $AD_1$ and the outgoing channel 14 with address $AD_2$. The address $AD_1$ is stored in the store position 3 of line 11, so that the secondary intermediate channel with the sub-time intervals $s_3 \cdot t_{11}$ is connected to the outgoing channel number 13. The address $AD_2$ is stored in the store position 7 of line 11, so that the secondary intermediate channel with the subtime intervals $s_7 \cdot t_{11}$ is connected to the outgoing channel number 14.

Each secondary intermediate channel has access to three channels having different numbers of the outgoing multiple group. Conversely, as appears from the table of FIG. 2, each outgoing channel is accessible to 3.15 = 45 secondary intermediate channels. As an example is mentioned the outgoing channel number 20 which is accessible to the secondary intermediate channels the sub-time intervals of which are situated in the main time intervals $t_{17}$, $t_{18}$ and $t_{19}$. These are the secondary intermediate channels corresponding to the lines 17, 18 and 19 of the table shown in FIG. 2.

Each incoming channel has access to each primary intermediate channel of the primary intermediate line and this intermediate line can be connected via the switching network 117 to all secondary intermediate lines, so that each incoming channel has access to all secondary intermediate channels of all secondary intermediate lines. A given outgoing channel is accessible via a group of 45 secondary intermediate channels so that in total there are 45 possibilities of connecting each incoming channel to each outgoing channel.

In order to establish a connection between a given incoming channel and a given outgoing channel, a secondary intermediate channel is to be selected from the group of 45 secondary intermediate channels giving access to the outgoing channel. The selection criterion is that the secondary intermediate channel and the primary intermediate channel having the same number of the relevant primary intermediate line are both free. The choice of the intermediate channel determines the address of the store position of the address stores 114, 112, 132 and 137 which are used for the connection. The address of the incoming channel is stored in address store 114, the address of the outgoing multiple group, i.e. th address of the secondary intermediate line to be used, is stored in address store 121, the address of the outgoing transmission line is stored in address store 132 and the address of the single parallel-series converter of the outgoing channel is stored in address store 137.

The searching and adjusting of connections is performed by a central control unit not shown, the construction of which is of no essential importance for the understanding of the present invention, so that it is omitted.

If two single parallel-series converters are used in a multiple parallel-series converter, each outgoing channel is accessible only to 15 secondary intermediate channels. Every increase of the number of single parallel-series converters by one increases th accessibility by 15 secondary intermediate channels. In this manner the accessibility can be increased arbitrarily and the internal blocking probability can be reduced arbitrarily. The internal blocking probability is the conditional probability that at a calling instant an incoming channel cannot be connected to an outgoing channel if the outgoing channel is free.

A number of modifications of the described principle are possible for achieving an increased accessibility, which will be described in brief. It is efficient to indicate a multiple parallel-series converter, such as 134-0, as an (outgoing) line unit or as a multiple character buffer and to indicate the single parallel-series converters, such as 135-0, 135-1, 135-2 and 135-3, as single character buffers. The first modification occurs when an outgoing transmission line, such as 128-0, is designed for the transmission of characters (in main time intervals) in parallel form. The parallel-series conversion can then be omitted. In a single character buffer only a conversion of the supplied characters is then effected from the sub-time intervals in which the characters are received to the main time intervals in which the characters are transmitted via the outgoing transmission line. A second modification occurs when the characters in the exchange (in sub-time intervals) are transmitted in series form and the characters are transmitted in series form via the outgoing transmission line in main time intervals. A third modification occurs when in the latter case the characters are transmitted in parallel form via the outgoing transmission line. It applies to all modifications that a conversion of the characters is effected in the single character buffers from the sub-time intervals to the main time intervals. This conversion may leave the form in which the characters occur unchanged, or may be attended by a parallel-series conversion or a series-parallel conversion.

After an explanation of the operation principle of the multiple parallel-series converters, one embodiment will be described with reference to FIGS. 3 and 4.

In the exchange use is made only of digital signals having two possible voltage levels, which correspond to the logical states 0 and 1. A clock pulse has a level which corresponds to that of the logical state 1 and the level of the clock pulse interval corresponds to that of the logical state 0. An AND-gate has the logical output state 1 only if all logical input states are 1. An OR-gate has the logical output state 1 only if at least one of the logical input states is 1.

In the embodiment use is made of synchronous counters, shift registers, decoders, AND-gates and OR-gates. The specification of their operation is reaction to the supply of logical signals and/or clock pulses gives sufficient information to enable their realization in some system of logical switching elements. The synchronous counters and shift registers have the same general operation as a JK-flipflop of the master-slave type, that is to say, during the logical voltage level 1 of the clock pulse the master flipflops are set in accordance with a logical state combination, which is externally supplied or is generated internally, and the slave or output flipflops are set with the information from the master flipflops during the trailing edge of the clock pulse. The clock input of a counter or shift register is indicated in the Figures by C.

A group of parallel lines which is used for transmitting a character or other code work in parallel form, is represented by an encircled line.

The connection of a line to a circuit forms an input of the arrow points towards the symbol of the circuit, while it forms an output in the opposite case. The connection of a group of parallel lines forms a multiple input or a multiple output, respectively.

Figure 3:
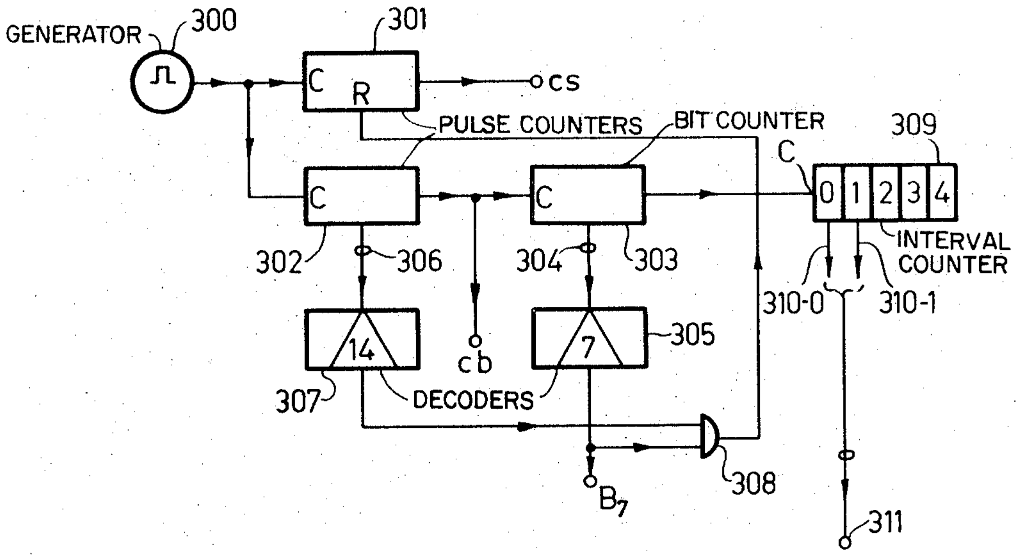
FIG. 3 is the block diagram of a part of the local clock of the telecommunication exchange shown in FIG. 1.
Figure 5:
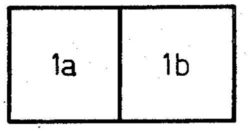
FIG. 5 is the arrangement for the FIGS. 1*a* and 1*b*.
Figure 4:
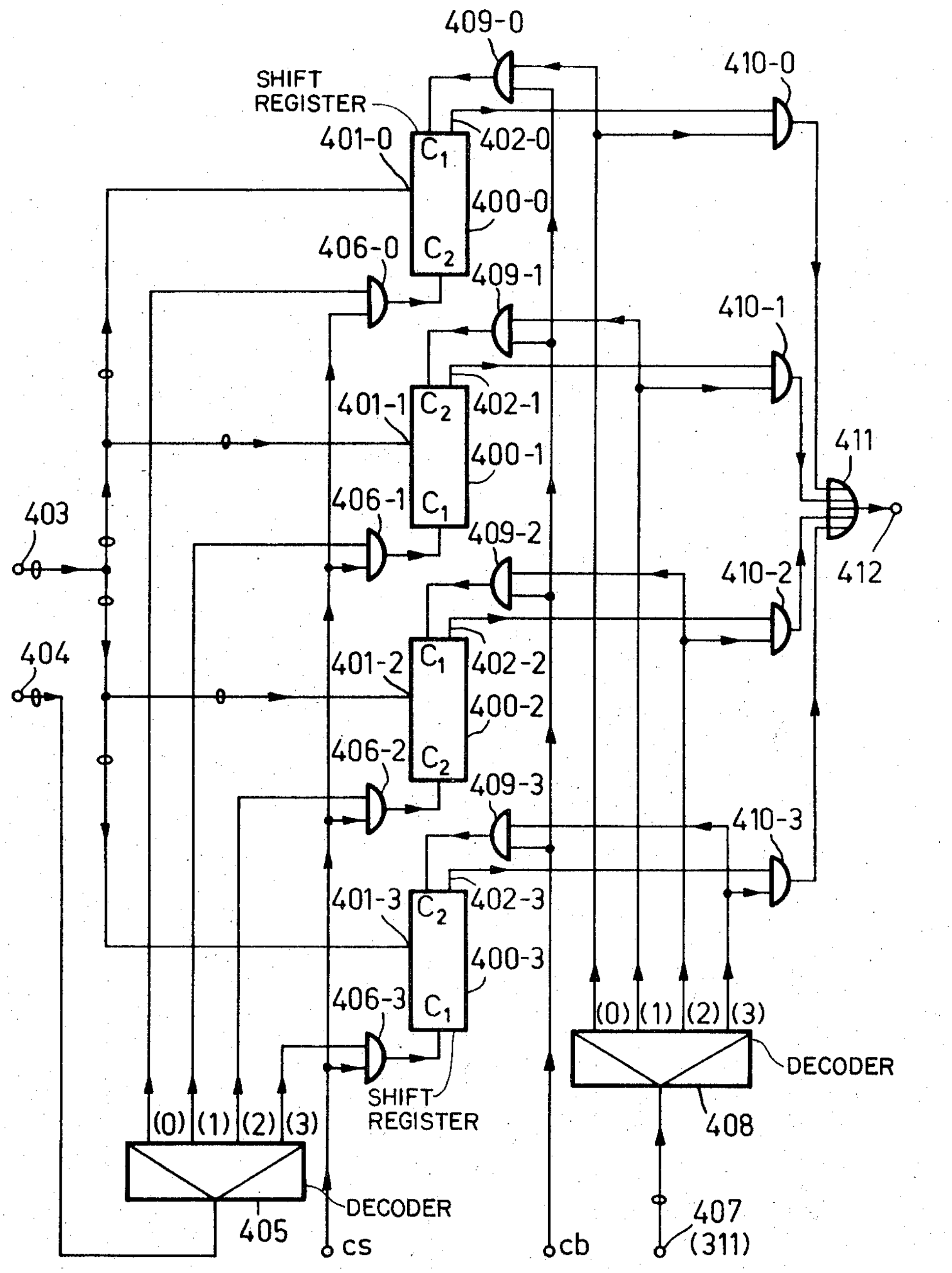
FIG. 4 is an embodiment of a multiple parallel-series converter according to the invention.

Reference is first made to FIG. 3, in which only the portion of the local clock of the exchange is shown which is of importance for the explanation of the operation of the embodiment according to FIG. 4. The local clock according to FIG. 3 comprises a clock pulse generator 300, which generates a sequence of equidistant clock pulses sequence having a repetition frequency which is 8.15 = 120 times as high as the character repetition frequency of a multiplex channel. This clock pulse sequence is applied to a modulo-eight pulse counter 301. The cycle of this counter amounts to eight clock pulse periods and is equal to one sub-time interval. A clock pulse *cs* is supplied once per cycle on an output of this counter. The clock pulse sequence of clock pulse generator 300 is also supplied to a modulo-15 pulse counter 302. The cycle of this counter amounts to 15 clock pulse periods and is equal to 1 bit interval. A clock pulse *cb* is supplied once per cycle on an output of this counter. The sequence of clock pulses *cb* is supplied to the clock input of a modulo-8 bit counter 303. The cycle thereof amounts to 8 bit intervals and is equal to one main time interval. The numbers of the bit intervals are presented in a binary code on a multiple output 304 of bit counter 303 connected to this multiple output is a decoder 305 for the number 7, which is the number of the last bit interval of a main time interval. The signal $B_7$ arising on output $B_7$ of decoder 305 has the logical voltage level 1 only in bit interval $b_7$.

Counter 302 has a multiple output 306 on which the numbers of the clock pulse periods are presented in a binary code. Connected to this output is a decoder for the number 14 which is the number of the last clock pulse period of a bit interval. The outputs of the decoders 307 and 305 are connected to the inputs of an AND-gate 308, the output of which is connected to a reset input of counter 301. The logical voltage level 1 on the reset input resets the counter to position 0. If this reset has been effected once after the local clock has been switched on, counter 301 will start its cycle at the beginning of each main time interval simultaneously with counter 302. In this manner each main time interval determined by counter 303 will comprise 15 integral sub-time intervals.

The output of bit counter 303, the logical voltage level of which changes over from 1 to 0 once in every cycle, is connected to the clock input of a modulo-32 main time interval counter 309. The latter has five stages corresponding to the number of bits required for counting to 32. The first two stages of counter 309 count the main time intervals modulo-four. The main time interval number modulo-four is presented in a binary code on the outputs 310-0 and 310-1, which are combined to form one multiple output 311.

The multiple parallel-series converter according to FIG. 4 comprises the shift registers 400-0, 400-1, 400-2 and 400-3. Each shift register 400-*i*, where $i = 0, 1, 2, 3$, has a multiple input 401-*i* for the reception of a character in parallel form. During the logical voltage level 1 of clock input $C_1$ the multiple input is rendered sensitive and the character is stored in the shift register. During the logical voltage level 0 of clock input $C_1$ the multiple input is insensitive. Each shift register furthermore has a single output 402-*i* for the transmission of a character in series form. Each clock pulse supplied to clock input $C_2$ shifts the character one bit position further and eight clock pulses shift the character out of the shift register.

In sub-time intervals characters are supplied to the multiple input 403 from an output of a demultiplexer such as 131 in FIG. 1, and addresses are supplied to the multiple input 404 from an output of an address demultiplexer such as 141 in FIG. 1.

The multiple input 403 is connected in parallel with the multiple inputs of all shift registers, 400-0, 400-1, 400-2 and 400-3. The multiple input 404 is connected to a decoder 405 which decodes the binary coded addresses. The decoder 405 has four outputs, the output (*i*) of which, where $i = 0, 1, 2, 3$, has the logical voltage level 1 when the address of shift register 400-*i* is supplied. Each shift register 400-*i* is associated with an AND-gate 406-*i*, the output of which is connected to the clock input $C_1$ of the shift register, one input being connected to output (*i*) of decoder 405. A second input of each of the AND-gates 406-0, 406-1, 406-2 and 406-3 is connected to an input for the clock pulses *cs* of the local clock. When the address of shift register 400-*i* is supplied to the multiple input 404, the AND-gate 406-*i* is connected via decoder 405 and the gate supplies a clock pulse to the clock pulse input $C_1$ of shift register 400-*i*. Under the control of this clock pulse the character supplied to the multiple input 403 is stored in shift register 400-*i*.

In main time intervals the binary coded main time interval numbers modulo-four, used for indicating the shift registers in a cyclic sequence, are supplied to the multiple input 407. These numbers originate from the multiple output 311 of the local clock according to FIG. 3. The multiple input 407 is connected to a decoder 408 which decodes the binary coded numbers. Decoder 408 has four outputs and it may be assumed that the main time interval number *j* modulo-four, where $j = 0, 1, - - - , 31$, sets the output (*i*), where $i = j$ modulo-four, to the logical state 1.

In addition, two AND-gates 409-*i* and 410-*i* are associated with each shift register 400-*i*, where $i = 0, 1, 2, 3$. The output of AND-gate 409-*i* is connected to the clock input $C_2$ of the shift register and one input is connected to outtput (*i*) of decoder 408. A second input of each AND-gate 409-0, 409-1, 409-2 and 409-3 is connected to an input to which the clock pulses *cb* of the local clock are supplied. One input of AND-gate 410-*i* is connected to the single output 402-*i* of shift register 400-*i* and a second input is connected to output (*i*) of decoder 408. The outputs of the AND-gates 410-0, 410-1, 410-2 and 410-3 are connected to an OR-gate 411 the output 412 of which forms the output of the multiple parallel-series converter. The latter output serves for connection to an outgoing transmission line such as 128-0 according to FIG. 1.

In the main time interval $t_j$, where $j = 0, 1, - - - , 31$, the AND-gates 409-*i* and 410-*i*, where $i = j$ modulo-four, are actuated, so that in this main time interval s series of eight clock pulses *cb* is applied to the clock pulse input $C_2$ of shift register 400-*i* and the character stored therein is supplied in series form via AND-gate 410-*i* and OR-gate 411 to the output 412.

With reference to the functional diagram of the multiple parallel-series converter 134-0 shown in FIG. 1, it is to be noted that in FIG. 3 the function of distribution unit 136 is performed by the clock pulse gates 406-0, 406-1, 406-2 and 406-3 in co-operation with the shift registers. The function of combination unit 138 is performed by the clock pulse gates 409-0, 409-1, 409-2 and 409-3 in co-operation with the shift registers and by the AND-gates 410-0, 410-1, 410-2 and 410-3.

What is claimed is:

1. A telecommunication system with time division multiplex, comprising a source of multiplex telecommunication signals, which comprises a multiple group of single connection channels for the transmission of information characters; a plurality of outgoing transmission lines, each of said transmission lines comprising a group of single transmission channels for the transmission of information characters; a separate transmission line unit connected to each transmission line; a clock for generating a time scale which is divided into mutually equal frame time intervals, each interval of which is divided into mutually equal main time intervals, each of which is further divided into mutually equal sub-time intervals, a switching unit connected to said transmission line units and said source of telecommunication signals and having connected thereto a control unit containing variable control information for selectively switching the telecommunication signals from the source of telecommunication signals to each selected transmission line unit in the sub-time intervals of selected connection channels on a separate output line; each transmission line unit containing at least three single character buffer means for receiving information characters in sub-time intervals from the output line of the switching unit connected thereto and for transmitting the received information characters to the single corresponding transmission line in main time intervals, each transmission line unit being connected to a control unit containing variable control information for supplying control information to the transmission line unit in the sub-time intervals of said selected connection channels associated with the source of telecommunication signals; each transmission line unit further comprising a distribution unit connected to said buffers and to the output line of the switching unit connected thereto for distributing information characters from the switching unit over the single character buffers in dependence upon the control information, and a combination unit for connecting the single character buffers in a cyclic sequence to the associated single transmission line in main time intervals of the clock.

2. A telecommunication system as claimed in claim 1, wherein the character buffers are formed by single parallel-series converters.

* * * * *